United States Patent [19]

Rubik

[11] Patent Number: 4,640,062
[45] Date of Patent: Feb. 3, 1987

[54] FRAMEWORK TRUSS WITH VARIABLE CANTILEVER LENGTH

[75] Inventor: Erno Rubik, Budapest, Hungary

[73] Assignee: Kozponti Valto-es Hitelbank Rt., Budapest, Hungary

[21] Appl. No.: 760,725

[22] PCT Filed: Oct. 31, 1983

[86] PCT No.: PCT/HU83/00055

§ 371 Date: Jun. 28, 1985

§ 102(e) Date: Jun. 28, 1985

[87] PCT Pub. No.: WO85/01865

PCT Pub. Date: May 9, 1985

[51] Int. Cl.[4] .................... E04H 12/18; A47F 5/08
[52] U.S. Cl. ........................... 52/109; 52/645;
52/695; 248/280.1; 248/281.1
[58] Field of Search .................... 52/109, 645, 695;
248/280.1, 281.1

[56] References Cited

U.S. PATENT DOCUMENTS

| | | | |
|---|---|---|---|
| 2,161,337 | 6/1939 | Cordova | 52/645 X |
| 3,593,481 | 7/1971 | Mikulin | 52/632 |
| 3,774,873 | 11/1973 | Krogsrud | 248/324 X |
| 4,160,536 | 7/1979 | Krogsrud | 248/123.1 X |
| 4,208,028 | 6/1980 | Brown et al. | 248/280.1 X |
| 4,266,747 | 5/1981 | Souder, Jr. et al. | 248/123.1 X |

Primary Examiner—Alfred C. Perham

[57] ABSTRACT

Framework truss with changeable cantilever length, comprising an articulated grid structure which is hingedly secured at two fixed points against a wall or any other carrier element. Said framework truss is characterized in that at least two articulated grid panels are joined together having the shape of a parallelogram and projecting in the cantilever direction (L) from two fixed articulation points (A, B) situated at a certain interval (h) from each other. The articulated grid panels are comprised of parallel articulated bars (21, 22, 23, 24, 25 and 26), as well as coupling rods (31, 32, 33) connecting them by pairs from their ends between the articulation points (C1, D1; C2, D2; C3, D3) and of which the length remains always equal to the interval (h) separating the fixed articulation points (A, B). At least one point (B) of the fixed articulation points (A, B) is connected to the diagonally opposite articulation point (D3) of the terminal coupling rod (33) and used at the same time as a charge induction member, of the last articulated grid panel in the cantilever direction (L) by at least one expansion-free cable (4) which passes or is brought along diagonals of similar direction of articulated grid panels and between these diagonal segments, along the coupling rod, respectively the coupling rods (31, 32).

11 Claims, 1 Drawing Figure

FRAMEWORK TRUSS WITH VARIABLE CANTILEVER LENGTH

TECHNICAL AREA OF THE INVENTION

The invention relates to a lattice bracket of variable cantilevered length, which bracket has an articulated lattice structure which is pivotally fastened at two fixed points on a wall or on any other support.

DESCRIPTION OF THE STATE OF THE ART

Brackets, especially wall brackets of various forms and for various purposes are already known in a great number of configurations. The simplest wall brackets are, for example, in the form of designs which can be extended in a bellows-like manner, consisting of two legs or flaps crossing one another at joints. These wall brackets are usually pivotable laterally on a bolt disposed on a plate that can be fastened to the wall. Therefore, such wall brackets can also be shifted in planes parallel to the wall. A bracket of variable cantilevered length constructed in the manner of a so-called lazy tongs is described in detail in DE-AS 2 119 849. It is constructed essentially by doubling a two-legged shear in a bellows-like extensible or contractable manner such that the double shear is supported in the middle part by a beam, the two ends being connected each to a transverse frame. Thus the double shear forms a frame which can be collapsed on both sides. The collapsibility is assured by the articulation of the double shear.

Another wall bracket configuration is disclosed in DE-AS 2 207 521. This wall bracket is intended especially for hanging articles of clothing (such as trousers, jackets etc.) in shops. The wall bracket is of rigid construction and it is supported in a shaped plate fastened to the wall by screws at two points, but so as to be pivotable laterally.

Another wall bracket design is provided for the holding and display of articles of clothing, which is described in detail in German Pat. No. 1,813,359. To a pentagonal plate affixed by screws to the wall there is fastened an upright support of wood or metal on which clothing hangers can ride.

Lastly, another wall bracket design is disclosed in DE-PS 2 019 457, which is also intended for the holding and display especially of garments in shops. In this case a plurality of radially cantilevered telescoping or non-telescoping supports are fastened by two bolts or pins disposed at different levels in a sleeve which can be rotated about a column or standard.

In addition to those described above, wall brackets are also known in a great number of other configurations, but in most cases they are rigid supports held at one end. While these supports are generally of constant, invariable length, the shear type constructions which can be extended and retracted in the manner of bellows have the disadvantage that only a vertically downwardly directed force acts on the free end at the point of engagement of the load, so that the loaded end of the bracket usually sags, and the bracket itself undergoes a permanent change of shape or deformation.

SUMMARY OF THE INVENTION

The object of the present invention is to create a bracket of variable length which will be free of the above-mentioned disadvantages of the known wall bracket designs, especially the extensible and contractable types, and whose cantilevered length can be varied in a simple manner but will remain steady after being varied, and in which the loading force will bring about a favorable distribution and transmission of the reaction forces occurring under load in the bracket links to the preferably articulated mounting points.

The stated object is attained by the creation and use of a lattice-like bracket of the kind specified in the beginning, in which, in the meaning of the invention, starting out from two fixed, spaced-apart pivot points, at least two parallelogram-like articulated lattice fields, each consisting of articulated links and of spacers of a length always equal to the spacing between the fixed pivot points and joining the ends of the links together in pairs, are in tandem arrangement, and at least one of the fixed pivot points is connected to the diagonally opposite articulation point of the outermost spacer of the outermost articulated lattice field in the direction of extension by at least one substantially elongation-free pull cable which runs along diagonals of the articulated lattice fields and runs along the spacers between these diagonal sections. In the case of lattice brackets in accordance with the invention, which can carry loads at their free end in the same line of effect but in both load engagement directions, preferably each of the two fixed pivot points is connected to the diagonally opposite articulation points of the outermost spacer of the outermost jointed grid field in the direction of extension by two substantially elongation-free pull cables, each running along like-leaning diagonals of the parallelogram-like articulated lattice field and, between these diagonal sections, running along the spacers.

In practice, embodiments of the lattice bracket of the invention have proven extremely advantageous wherein the fixed pivot points are connected to the diagonally opposite articulation points of the outermost spacer of the outermost articulated field by prestretched cables preferably of cord, braided steel or plastic or the like, which run along the spacers and pass in alternate directions around pulleys freely rotating preferably on the same axis as the articulations. For the purpose of assuring a minimal freedom of movement, restricted to a direction perpendicular to the direction of outreach, of the lattice bracket of the invention, it is advantageous for the distance between the fixed pivot points to be always smaller than the lengths of the links of the articulated lattice fields, and/or for the lengths of the links of the articulated lattice fields to be equal.

The outermost spacer of the outermost articulated lattice field in the direction of extension can advantageously also be configured as the load application member, and it has been found advantageous for the fixed pivot points to be disposed separate from one another in a vertical alignment. An expansion of the possible and advantageous field of application and use of the lattice bracket of the invention is provided by embodiments thereof which are articulated at stationary pivot points such that the links of the first articulated lattice field in the direction of extension can pivot in a vertical plane passing through the fixed pivot points and also about a vertical axis joining the pivot points. The fixed pivot points can also be disposed to advantage on a support plate, a support disk or some other mounting means which is removably fastened to a wall or to any other supporting element.

BRIEF DESCRIPTION OF THE DRAWING

The essence of the invention will be further described below with the aid of an embodiment in conjunction with the drawing. The drawing presents as an example the static-dynamic scheme of a lattice bracket of variable extension in accordance with the invention, consisting of three articulated lattice fields in tandem, in which the lengths of the links of the individual parallelogram-like fields are all different.

DESCRIPTION OF AN EMBODIMENT OF THE INVENTION

Figure 1:
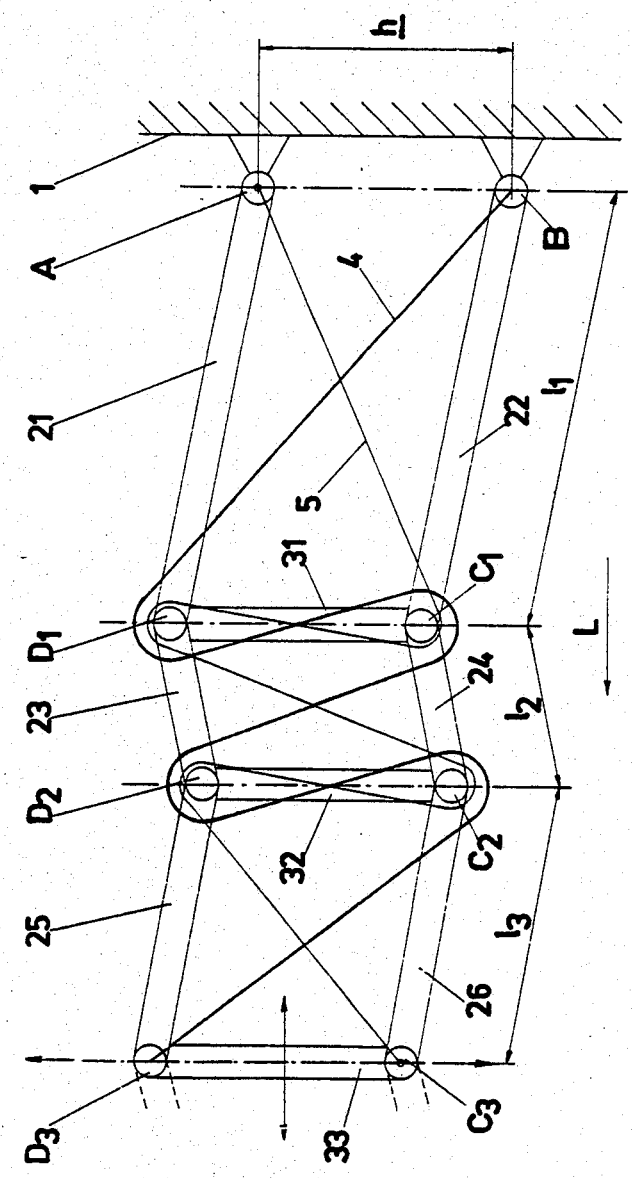

The lattice bracket of the invention, in accordance with the above-mentioned drawing, is fastened at one end, i.e., cantilevered, to pivot points A and B, which are fixedly arranged one vertically above the other on a wall 1 in a manner not further described. It consists of three articulated lattice fields which are formed, starting out from the fixed pivot points A and B in the direction of extension L, one by links 21 and 22, and a spacer 31, another by links 23 and 24 and a spacer 32, and another by links 25 and 26 and a final spacer 33. The distance C1D1, C2D2 and C3D3 of the terminal joints of the spacers 31, 32 and 33 are always equal to the distance h between the fixed pivot points A and B. The links 21, 22, 23, 24, 25 and 26 are of equal length pairwise, and have the lengths $l_1$, $l_2$ and $l_3$ in that order. Accordingly, the articulated lattice structure of the lattice bracket of the invention, no matter what its position, is a lattice support of three parallelogramic lattice fields. The fixed pivot point B is connected to the diagonally opposite (upper) pivot point D3 of the final, terminal spacer 33 by a substantially elongation-free pull cable 4, consisting for example of prestretched braided steel rope, such that the cable 4 is always guided along diagonals leaning in the same direction (BD1, C1D2 and C2D3) across the articulated lattice fields, and between these diagonal sections, along the spacers 31 and 32, it is passed in alternate directions about pulleys (not shown in the drawing) loosely pivoted at the joints D1, C1, D2 and C2. In like manner, a second cable 5, which is likewise substantially elongation-free, is guided between the fixed pivot point A and the diagonally opposite pivot point C3 of the outermost spacer 33 of the outermost articulated lattice field in the direction of extension, along diagonals AC1, D1C2 and D2C3, and, between these diagonal sections, in alternate directions about loosely pivoted pulleys at the pivot points C1, D1, C2 and D2.

Since in the embodiment of the lattice bracket of the invention represented in the drawing the fixed pivot points are disposed vertically one over the other, all of the spacers 31, 32 and 33 remain vertical when the extended length of the bracket is changed, as indicated in the drawing by a double-headed arrow across link 33, while the angular attitudes of the pairs of links 21–22, 23–24 and 25–26 change. The height of the spacers 31, 32 and 33 vary in the vertical direction, too, by virtually negligible amounts. The greater the ratios of the lengths $l_1$, $l_2$ and $l_3$ are to the distance h, and the smaller the differences between the lengths $l_1$, $l_2$ and $l_3$, the less will be the change in height.

The spacer 33 that is the outermost in the direction L, can bear a load in the vertical direction without thereby changing the extended length. The extended length of the lattice bracket of the invention can, however, by changed without appreciable resistance by components of force which act in the direction of the double arrow shown in the figure, i.e., horizontally in the present case. The spacer 33 can either be constructed as the load-applying member of itself, or a load-bearing element of any kind, such as a hook, a bolt or the like, can be affixed to it. In the case of a vertically acting load, an upwardly acting reaction force is produced at one of the pivot points C3 or D3, while a downwardly acting reaction force is produced at the other, depending on the direction of the loading. At the center of gravity of the lattice bracket, however, naught but a gravity force proportional to the mass of the bracket will be present.

The simplest embodiments of the lattice bracket of the invention contain only two parallelogramic articulated lattice fields. Depending on the desired length of extension, however, as further developments of the embodiment shown merely by way of example in the drawing, lattice brackets consisting of more than three articulated lattice fields are made in accordance with the invention. The cross sections of the links and spacers can be freely designed, as regards shape and size, according to the particular application involved. The same applies to the selection of the materials. At the same time, factors relating to aesthetics are also to be considered. Also, the design of the articulation is left to the judgment of the designer. It can often be advantageous to design wall brackets of variable length which can rotate horizontally relative to the plane of the wall. In interior architecture designs have often been found desirable which can be anchored articulately at fixed pivot points A and B which are disposed on a wall 1 or on any other desired support which can be fastened, preferably removably, for example by screws or hangers, support plates etc., of a decorative effect.

Within the scope of the protection set forth in the following claims, the cables 4 and 5 can be freely designed, configured and dimensioned as regards their materials, end fastening and the manner in which they are guided around the corresponding pivot points, which will not be further discussed herein.

I claim:

1. A lattice bracket of variable cantilevered length, said bracket having an articulated lattice structure for fastening articulately at two fixed points on a wall or other support, said lattice structure comprising at least two parallelogram-like articulated lattice fields, each lattice field consisting of two parallelly disposed links and of a spacer, said spacer having a length equal to the distance between said two fixed pivot points, and joining together in pairs the ends of the two links between pivots, said lattice fields being disposed in tandem continuously in a direction away from said fixed pivot points, and at least one substantially elongation-free cable connecting at least one of said fixed pivot points to the diagonally opposite pivot of the last spacer of the last articulated lattice field said cable running along like-leaning diagonals of the articulated lattice fields, and between said fields running along the respective spacer.

2. A lattice bracket according to claim 1, comprising two elongation-free cables connecting said two fixed pivot points respectively with the diagonally opposite pivots of the last spacer of the last articulated lattice field, each cable running along like-leaning diagonals of the articulated lattice fields and, between the fields, along the respective spacer.

3. A lattice bracket according to claim 1 or 2, wherein each cable is a pre-stretched cable of cord, braided steel rope, plastic, or the like.

4. A lattice according to claim 1 or 2, wherein each cable is guided in alternate directions around pulleys freely pivoted at the pivots.

5. A lattice bracket according to claim 4, wherein said pulleys are coaxial with the pivots.

6. A lattice bracket according to claim 1, wherein the distance between said fixed pivot points is smaller than the lengths of the links.

7. A lattice bracket according to claim 1, wherein the lengths of the links are equal.

8. A lattice bracket according to claim 1, wherein the spacer of the last articulated lattice field is a load supporting member.

9. A lattice bracket according to claim 1, wherein the fixed pivot points are disposed vertically above one another.

10. A lattice bracket according to claim 5, wherein the links connected to the fixed pivot points are pivotable about an axis through said fixed pivot points.

11. A lattice bracket according to claim 1, wherein the fixed pivot points are disposed on means removably fastened to a wall or support.

* * * * *